June 30, 1942. W. E. JOMINY 2,287,884
PISTON RING
Filed July 2, 1940

Inventor
Walter E. Jominy
By Blackmor, Spencer & Flint
Attorneys

Patented June 30, 1942

2,287,884

UNITED STATES PATENT OFFICE 2,287,884

PISTON RING

Walter E. Jominy, Detroit, Mich., assignor to General Motors Corporation, Detroit, Mich., a corporation of Delaware Application July 2, 1940, Serial No. 343,588

5 Claims. (Cl. 309—44)

This invention relates to piston rings, and especially to piston rings for maintaining the requisite seal between the piston and cylinder of an internal combustion engine.

The object of the invention is a piston ring having improved resistance to scuffing and wear.

The above and other objects of the invention will be apparent as the description proceeds.

According to the invention, the piston ring, which may be of cast iron or steel, has, in its rubbing surface, fine circumferential grooves which are lined or partially filled with tin or any other suitable relatively soft metal. The partial filling of the grooves with tin or the like may be effected by electro-plating the rubbing surface of the piston ring with the soft metal, to a thickness sufficient to line without filling the grooves, and then removing substantially all the plating from over the rubbing surface of the ring, to size.

The drawing shows one construction according to the invention.

Figure 1:
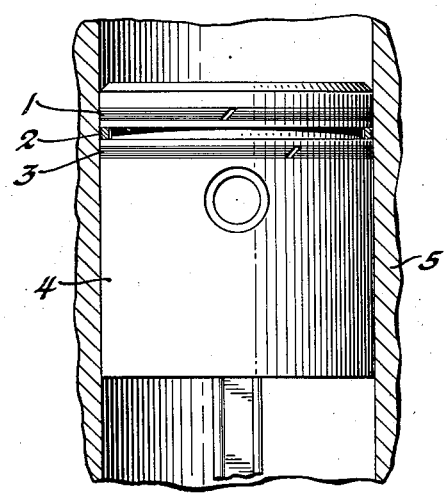
Fig. 1 is a sectional view of an engine cylinder showing therein a piston to which three packing rings (one shown in section), according to the invention, have been applied.

In Fig. 1, the piston rings 1, 2 and 3, are shown in position on a piston 4, within a cylinder 5.

Figure 2:
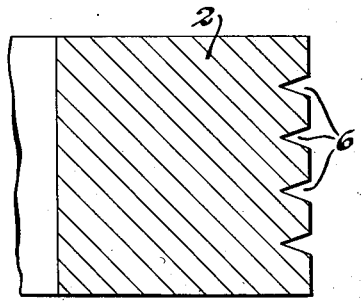
Fig. 2 is an enlarged sectional view of one of the piston rings, showing the grooves therein, untinned.
Figure 3:
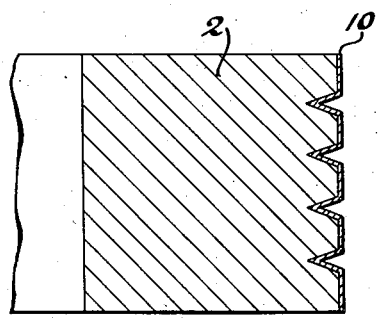
Fig. 3 is an enlarged sectional view of the same piston ring after its rubbing surface has been tin plated, and the grooves have been partially filled with tin.
Figure 4:
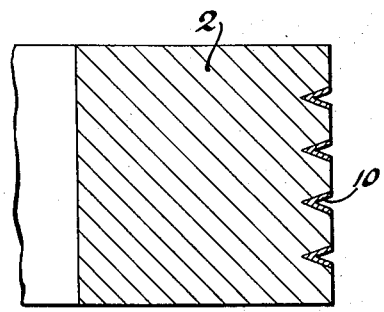
Fig. 4 is an enlarged sectional view of the same piston ring after it has been machined to size by the removal of the plating from the rubbing surface of the ring.

Each of the piston rings has a plurality of fine circumferential grooves such as 6 cut in its rubbing surface, as shown most clearly in Figs. 2, 3 and 4.

In Fig. 3, the rubbing surface and the sides of the grooves have been plated with tin 10, which lines or partly fills the grooves.

In Fig. 4 the tin plating 10 on the rubbing surface, has been removed, leaving only the sides of the grooves lined with tin.

In the example illustrated, the piston ring is .125" wide, and the four grooves therein are .010" wide and .015" deep. The grooves are separated by .015", while the topmost and lowermost grooves are .020" from the edges of the ring. The thickness of tin plating 10, as shown in Figs. 3 and 4 is about .004". It will be noted that the cross-sectional dimensions of the tin lined grooves are actually very small.

While the grooves in the piston ring might be lined with tin in other ways, as by spraying molten tin therein, or hammering a strip of tin therein, it has been found that the plating process is a most convenient way of doing this.

It will be observed from an examination of Fig. 4, that the tin plating in the grooves extends out to the rubbing surface of the piston ring which thereby is comprised of a series of annular laminated areas of a hard metal, a soft metal, a space, a soft metal, and a hard metal, in succession, or expressed otherwise, that there are spaced circumferential bands of soft metal in the cylindrical surface of the ring, with circumferential oil grooves in the soft metal.

The piston ring has improved life, probably for the reason that it has a plurality of edges of anti-friction material formed by the tin and the oil grooves therein, and that throughout the life of the ring a small quantity of the tin, well lubricated by the oil in the grooves therein, is wiped over the rubbing surface of the ring, which has an adequate area of the harder springy metal to maintain a long lived seal between the piston and the cylinder. However, this may be, it has been found that the ring has greatly improved resistance to scuffing and wear, and a very much longer life than any other type of piston ring, under the very onerous conditions in a Diesel engine.

In some circumstances a thin layer of tin might be left over the surface of the rings.

I claim:

1. A piston ring having a circumferential rubbing surface, an oil groove in said surface, said oil groove being lined with an antifriction material extending to said rubbing surface.

2. A piston ring having a plurality of circumferential oil grooves in its rubbing surface, said oil grooves being lined with tin extending to the rubbing surface of the piston ring.

3. A piston ring having a circumferential rubbing surface, comprised of annular laminated areas of a hard metal, and a soft metal, and having an annular oil groove in one of said areas.

4. A piston ring of hard metal having a plurality of circumferential oil grooves in its rubbing surface, said oil grooves being lined with a soft anti-friction metal extending out to the rubbing surface of the piston ring, whereby the rubbing surface of the piston rings is comprised of a series of annular laminated areas of a hard metal, a soft metal, a space, a soft metal and a hard metal, in succession.

5. The combination according to claim 4, in which the ring is about .125" wide, and there are four grooves therein, each about .010" wide and .015" deep, separated by about .015".

WALTER E. JOMINY.